United States Patent
Huang

(10) Patent No.: US 10,735,653 B1
(45) Date of Patent: Aug. 4, 2020

(54) ELECTRONIC IMAGE STABILIZATION TO IMPROVE VIDEO ANALYTICS ACCURACY

(71) Applicant: Ambarella International LP, Santa Clara, CA (US)

(72) Inventor: Cheng-Yu Huang, Chupei (TW)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 15/458,227

(22) Filed: Mar. 14, 2017

(51) Int. Cl.
G06K 9/00 (2006.01)
H04N 5/232 (2006.01)
B64C 39/02 (2006.01)
B64D 47/08 (2006.01)

(52) U.S. Cl.
CPC ....... H04N 5/23267 (2013.01); B64C 39/024 (2013.01); B64D 47/08 (2013.01); G06K 9/00268 (2013.01); G06K 9/00744 (2013.01); *B64C 2201/024* (2013.01); *B64C 2201/108* (2013.01); *B64C 2201/127* (2013.01); *B64C 2201/146* (2013.01); *H04N 5/23258* (2013.01)

(58) Field of Classification Search
CPC .......... G06F 3/04815; G06F 17/30047; G02B 2027/0138; G06T 7/70; G06T 7/579; G06T 2207/10016; G06T 2207/30201; G06K 9/00302; G06K 9/00711
See application file for complete search history.

(56) References Cited

U.S. PATENT DOCUMENTS

| | | | |
|---|---|---|---|
| 9,854,155 B1* | 12/2017 | Sikka | H04N 5/23238 |
| 2007/0081081 A1* | 4/2007 | Cheng | G06T 3/4038 |
| | | | 348/218.1 |
| 2011/0298829 A1* | 12/2011 | Stafford | G06K 9/00248 |
| | | | 345/659 |
| 2015/0142213 A1* | 5/2015 | Wang | G05D 1/0016 |
| | | | 701/2 |
| 2015/0149000 A1* | 5/2015 | Rischmuller | B64C 39/024 |
| | | | 701/7 |
| 2015/0249806 A1* | 9/2015 | Gabel | H04N 5/23296 |
| | | | 348/14.12 |
| 2015/0338499 A1* | 11/2015 | Horvath | G01S 1/02 |
| | | | 348/169 |
| 2016/0033077 A1* | 2/2016 | Chen | F16M 13/04 |
| | | | 294/139 |
| 2016/0127641 A1* | 5/2016 | Gove | G06T 1/0007 |
| | | | 348/143 |
| 2016/0352992 A1* | 12/2016 | Saika | H04N 5/2328 |
| 2017/0185081 A1* | 6/2017 | Steele | G05D 1/0016 |
| 2017/0199588 A1* | 7/2017 | Ahn | G06F 3/0346 |
| 2017/0227162 A1* | 8/2017 | Saika | F16M 13/02 |
| 2018/0025498 A1* | 1/2018 | Omari | G06T 7/248 |
| 2019/0174063 A1* | 6/2019 | Huang | B64C 39/024 |
| 2019/0373103 A1* | 12/2019 | Oga | H04M 1/72569 |

\* cited by examiner

*Primary Examiner* — Guillermo M Rivera-Martinez
(74) *Attorney, Agent, or Firm* — Christopher P. Maiorana, PC

(57) ABSTRACT

An apparatus includes an image sensor and a processor. The image sensor may be configured to generate a sequence of video frames based on a targeted view of an environment. The processor may be configured to (A) perform an image stabilization on the sequence of video frames and (B) generate video analytics for the sequence of video frames, wherein the image stabilization comprises maintaining a horizon of the targeted view and is performed prior to generating the video analytics.

16 Claims, 9 Drawing Sheets

ELECTRONIC IMAGE STABILIZATION TO IMPROVE VIDEO ANALYTICS ACCURACY

FIELD OF THE INVENTION

The invention relates to video capture generally and, more particularly, to a method and/or apparatus for implementing electronic image stabilization to improve video analytics accuracy.

BACKGROUND

In computer vision, a class of algorithms generally known as Video Analytics has results that depend on the stability of the video signal. Video analytics can include human face tracking, a feature that is in high demand. Vibration, rotation and shaking affect the efficiency of video analytics algorithms. This is the case for face tracking and human tracking algorithms, many of which are based on an assumption about human face orientation. If the human face rotates too much, the detection and tracking will fail easily.

In a handheld device, rotation of the human face is typically corrected by a human hand stabilizing the camera. However, in a drone or a flying camera, vibration and rotation of the drone/camera during flight can make human face tracking difficult. A gimbal can help solve the problem, but the size and the cost of the gimbal make it very hard to adopt in low cost, low power consumer drone markets.

It would be desirable to implement electronic image stabilization to improve video analytics accuracy.

SUMMARY

The invention concerns an apparatus including an image sensor and a processor. The image sensor may be configured to generate a sequence of video frames based on a targeted view of an environment. The processor may be configured to (A) perform an image stabilization on the sequence of video frames and (B) generate video analytics for the sequence of video frames, wherein the image stabilization comprises maintaining a horizon of the targeted view and is performed prior to generating the video analytics.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing electronic image stabilization to improve video analytics accuracy that may (i) implement electronic image stabilization, (ii) compensate motion based on horizon monitoring, (iii) detect objects in a video, (iv) perform intelligent video analytics, (v) be implemented in a flying camera, (vi) be implemented for a camera associated with a drone, and/or (vi) be implemented as one or more integrated circuits.

In computer vision applications, a class of techniques generally known as video analytics provide results that depend on the stability of the video signal. Vibration, rotation and shaking can affect the efficiency of the video analytics algorithms. This, for instance, is the case for face tracking and human tracking algorithms, many of which are based on an assumption about human face orientation. If the human face in an image is rotated too much from the assumed orientation, the detection and tracking can fail easily.

In handheld devices, variation in the orientation of faces is generally fixed (corrected) by a human hand stabilizing the camera. However in drones or flying cameras, the vibration and rotation of the drone during flight can make human face tracking very difficult. A conventional solution uses a gimbal. The gimbal isolates the camera from the motion of the drone. The gimbal helps to solve the problem, but the size of the gimbal and the cost of the gimbal make the gimbal very hard to adopt in low cost, low power consumer drones.

In various embodiments, a drone or flying camera is provided that combines an electronic image stabilization (EIS) and horizon keeping processing phase with the video analytics (e.g., object tracking, motion tracking, face tracking) phase to allow the video analytics to work reliably with a drone design that does not use a gimbal. In general, embodiments of the invention enable the video analytics feature to work with much higher accuracy at lower cost relative to conventional systems.

Figure 1:
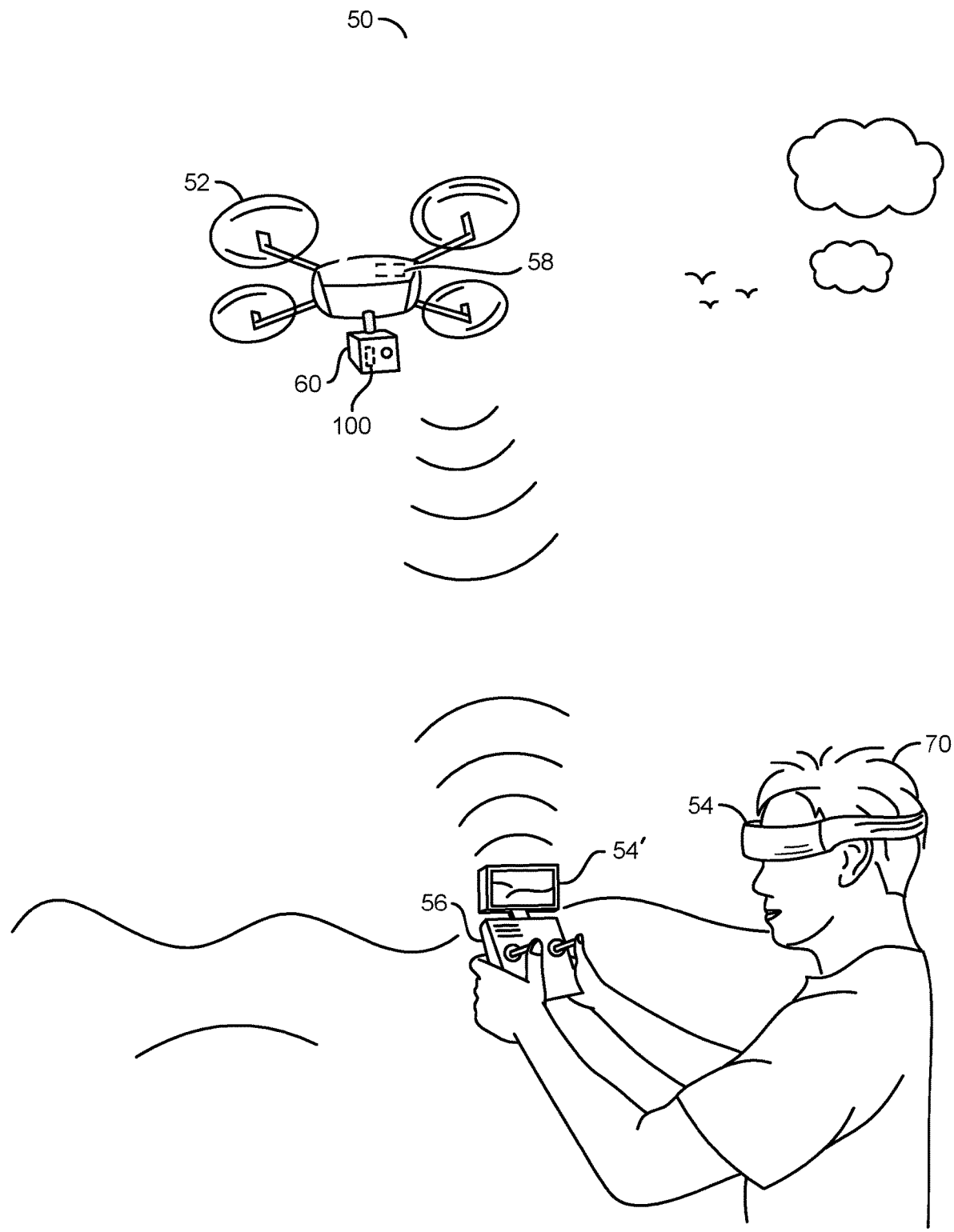
FIG. 1 is a diagram illustrating an embodiment of the invention.

Referring to FIG. 1, a diagram of a system 50 is shown illustrating an example embodiment of the invention. The system 50 may comprise an unmanned aerial vehicle (or drone or flying camera) 52, a playback (or viewing) device 54, a remote controller 56, a communication device 58, and a camera 60. The playback (or viewing) device 54 and the remote controller 56 may be used by a pilot 70 to control the unmanned aerial vehicle 52. In some embodiments, the camera 60 may be implemented as a separate device attached to the unmanned aerial vehicle 52. In some embodiments, the camera 60 may be integrated with the unmanned aerial vehicle 52 (e.g., a flying camera). In various embodiments, an apparatus 100 may be implemented as part of the camera 60. The system 50 may be implemented to control the unmanned aerial vehicle 52 and/or receive video from the perspective of the unmanned aerial vehicle 52.

The apparatus 100 may be implemented to generate video data and information about/from the video data (e.g., video analytics). In various embodiments, the video data may be point-of-view digital video. The video data may be stored on the unmanned aerial vehicle 52 and/or communicated over a network (e.g., via the communication device 58). In an example, the network may comprise a bandwidth-constrained network (e.g., a wireless network). The apparatus 100 may combine hardware de-warping, electronic image stabilization, horizon keeping, intelligent video analytics, and/or digital zooming.

In some embodiments, the camera 60 may also be capable of capturing panoramic video. Generally, a panoramic video may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video (e.g., the playback device 54). In some embodiments, the point-of-view digital video may be extracted from the panoramic video. In some embodiments, portions of the panoramic video may be cropped to the size of the display of the playback device 54 (e.g., portions of the panoramic video outside of the cropped portion may be discarded and/or not displayed). In some embodiments, the panoramic video may be panned in one or more directions to see additional portions of the panoramic video outside of the field of view of the playback device 54. For example, the panoramic video may comprise a spherical video, a hemispherical video, a 360 degree video, a wide angle video, a video having less than a 360 field of view, etc.

Panoramic videos may comprise a view of the environment near the camera 60. In one example, the entire field of view of the panoramic video may be captured at generally the same time (e.g., each portion of the panoramic video represents the view from the camera 60 at one particular moment in time). In some embodiments (e.g., when the camera 60 implements a rolling shutter sensor), a small amount of time difference may be present between some portions of the panoramic video. Generally, each video frame of the panoramic video comprises one exposure of the sensor (or multiple sensors) capturing the environment near the camera 60.

In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, the panoramic video may comprise a spherical field of view (e.g., capture video above and below the camera 60). In some embodiments, the panoramic video may comprise a field of view that is less than a spherical field of view (e.g., the camera 58 may be configured to capture the ground below and the areas to the sides of the camera 60 but nothing directly above). The implementation of the panoramic video may be varied according to the design criteria of a particular implementation.

In some embodiments, the system 50 may be implemented for first-person view (FPV) racing of the drone 52 and/or aerial surveying. For example, aerial surveying may be used to implement security surveillance from above. In another example, aerial surveying may be used for broadcast purposes (news reporting, sporting events, concert events, etc.). The playback device 54 may receive the video stream live from the drone 52. The pilot 70 may view the video stream using the playback device 54 to see a live view from the perspective of the drone 52. The pilot 70 may react to the environment by viewing the video captured by the apparatus 100 and provide control to the drone 52 using the remote controller 56. In a racing embodiment, the pilot 70 may need to react quickly to traverse a set course as fast as possible and/or prevent the drone 52 from crashing and/or traveling out of the bounds of the course. In a security surveillance embodiment, the pilot 70 may engage a tracking feature to automatically follow an object of interest (e.g., person, vehicle, etc.).

In one example, the bandwidth-constrained network may be a peer-to-peer (P2P) network (e.g., a direct connection between nodes without connecting to a central server). In another example, the bandwidth-constrained network may be a connection to a central server. The bandwidth-constrained network may be implemented as a wireless connection. In the example shown, a wireless network is shown communicating between the drone 52, the remote controller 56 and/or the playback device 54. In one example, the network may be implemented comprising a wired portion. In another example, the network may be implemented using a wireless connection or link (e.g., Wi-Fi, BLUETOOTH, ZIGBEE, radio frequency, etc.).

The drone 52 may be capable of hovering and/or moving in a variety of directions. For example, the drone 52 may accelerate and/or change direction quickly. The drone 52 may comprise the communication device 58, the camera 60, the apparatus 100, and/or other components (not shown). In some embodiments, the communication device 58 may be a component of (e.g., integrated with) the apparatus 100.

The playback device 54 may be implemented as a display, a wearable headset, or other video viewing device. The display 54 may be worn (or viewed) by the user (e.g., the pilot 70 and/or other viewers). The display 54 may be configured to display video frames (e.g., point-of-view video frames, panoramic video frames, portions of panoramic video frames, etc.) of the video transmitted from the unmanned aerial vehicle 52. The display 54 may present a portion of each of the video frames generated by the apparatus 100. The portion of each of the video frames that is displayed may be a region of interest. The region of interest may represent a portion of the panoramic video selected by the apparatus 100. For example, the display 54 may receive the region of interest portion of the panoramic video from the apparatus 100 and/or the communication device 58.

In some embodiments, a playback device 54' may be implemented as part of the remote controller 56, instead of the pilot 70 wearing the headset 54. In one example, the playback device 54' may be implemented as a touchscreen device. In some embodiments, the playback device 54' may be implemented as a smartphone and/or a tablet computing device. A display of the smartphone and/or tablet computing device may display the current region of interest to the pilot 70.

In some embodiments, the playback device 54' may be a desktop computer, laptop computer, notebook computer, etc. A computer monitor may be used to view the current region of interest. Computer input peripherals may be used by the pilot 70 to provide control input to the drone 52. In an example, a mouse cursor, keyboard controls, a joystick, and/or a software interface (e.g., API) may be implemented for the computer to control a flight path of the drone 52. The implementation of the playback device 54' may be varied according to the design criteria of a particular implementation.

The playback device 54 may be configured to receive the video stream from the drone 52. The video stream may be a live (or near-live) video feed of the video stream. The video stream may provide the pilot 70 with a point-of-view from the perspective of the drone 52. When the viewing device 54 is implemented as a headset, the video stream may provide a first-person view (FPV) of the drone 52. The playback device 54 may display the region of interest to the pilot 70.

The pilot 70 is shown holding the remote controller 56. In some embodiments, the playback device 54' may be implemented as a screen and/or handheld device (e.g., a screen that is part of the remote controller 56). The remote controller 56 may be configured to send control data to the drone 52 (e.g., provide flight control). For example, the remote controller 56 may implement a radio frequency (RF) transmission to control the drone 52. The pilot 70 may provide input to the remote controller 56 to direct the movement of the drone 52.

In some embodiments, the camera 60 may be implemented to provide a panoramic field of view (e.g., a camera configured to record panoramic video, spherical video, a 360 degree video and/or less than a 360 degree video, etc.) in addition to the point-of-view video stream. In one example, the panoramic field of view may allow an end user to view a video of the environment surrounding the camera 60 (e.g., a live stream). In another example, the panoramic field of view may allow the end user to view a previously recorded video of the environment surrounding the camera 60. The playback device 54 may be configured to selectably display the point-of-view or the panoramic field of view to the end user.

In some embodiments, the camera 60 may be implemented having one wide angle (or fisheye) lens. In some embodiments, the camera may be implemented as a multi-sensor camera. For example, the camera 60 may be implemented having more than one wide angle lens. The implementation of the camera 60 may be varied according to the design criteria of a particular implementation.

In some embodiments, the camera 60 may comprise the apparatus 100. In some embodiments, the apparatus 100 may be a component of the drone 52. The apparatus 100 may be implemented as a processor and/or a system on chip (SoC). For example, the apparatus 100 may be implemented as a printed circuit board comprising one or more components. The apparatus 100 may be configured to encode video frames captured by one or more capture devices of the camera 60. In some embodiments, the apparatus 100 may be configured to perform video stitching operations to stitch video frames captured by each of the capture devices. In some embodiments, the apparatus 100 may generate the panoramic video from one wide angle lens.

The apparatus 100 may be configured to capture images and/or video of the environment near the drone 52. For example, the apparatus 100 may capture the environment in the direction of flight and/or other directions selected by the pilot 70. The apparatus 100 may be configured to generate video signals based on the captured images from the camera 60. In some embodiments, the apparatus 100 may be configured to perform video stitching operations, de-warping operations, and/or video analytics operations on the video stream(s) received from the camera 60 to generate the video stream.

The apparatus 100 may format (or encode) the video signals to be transmitted wirelessly and/or stored locally. The apparatus 100 may be configured to perform intelligent video analysis on the video frames of the de-warped point-of-view or panoramic video. The apparatus 100 may be configured to crop and/or enhance the video frames.

The wireless communication device 58 may be configured to transmit the raw and/or cropped and/or enhanced video signal to the playback device 54. The wireless communication device 58 may be configured to receive flight control signals from the remote controller 56. For example, the drone 52 may comprise the wireless communication device 58, and the apparatus 100 may provide the video signal to the wireless communication device 58. The drone 52 is shown transmitting data wirelessly. For example, the drone 52 may wirelessly transmit a video stream generated by the apparatus 100.

Different communication channels may be implemented to transmit video (e.g., the point-of-view video and/or portions of the panoramic video) and drone control/telemetry. In an example, the communication device 58 may implement one channel to transmit video and a different remote-control (RC) channel for drone control (e.g., input from the pilot 70 using the remote control 56) and telemetry. Example frequencies may comprise 900 MHz, 1.2 GHz, 2.4 GHz and/or 5.8 GHz. In an example, if the drone 52 implements a RC transmitter on one of the frequencies for control, then, in order to avoid interference, another one of the frequencies may be selected for the transmitting the panoramic video signal. For example, many video transmitters operate at 5.8 GHz. Other frequencies may be implemented. The channels used for a particular type of communication (e.g., video or control) and/or the frequencies used may be varied according to the design criteria of a particular implementation.

In some embodiments, the remote controller 56 and/or flight control signals from the pilot 70 may be optional. For example, the drone 52 may implement an autonomous drone. In embodiments where the drone 52 is autonomous, the drone 52 may travel a pre-determined path and/or make decisions about where to travel without input from the pilot 70. In some embodiments, data generated in response to the intelligent video analysis performed by the apparatus 100 (e.g., face tracking, etc.) may be used by the drone 52 to make decisions to determine the flight path. In embodiments where the drone 52 is autonomous, the communication device 58 may still transmit the video signal to the playback device 54.

To provide a useful view to the pilot 70, the video stream may be generated by the apparatus 100 with low and/or negligible delay. The pilot 70 may be unable to react appropriately if there is lag (e.g., a delay) between what is viewed on the playback device 54 and where the drone 52 is actually located. The apparatus 100 may be configured to generate a viewable portion of the video that may be transmitted using a lower bitrate that still provides a high quality visual representation of objects detected by the apparatus 100. The apparatus 100 may be configured to provide a low-latency video stream from the drone 52 to the playback device 54 without sacrificing video quality in the selected region of interest. The apparatus 100 may be configured to generate a high resolution image within the total size constraints of the cropped region of the video.

The drone 52 may be configured to fly and travel in many directions and/or have an extended range of flight. Generally, a wired connection between the drone 52 and the playback device 54 may not be practical. Similarly, a wired connection between the drone 52 and a central server and/or a computing device may be impractical. To communicate with the playback device 54, the drone may implement a wireless connection using the wireless communication device 58. The wireless connection may have a limited bandwidth for transmitting data. The videos may comprise a large amount of data. The apparatus 100 may be configured to encode the video to reduce a bitrate of the video, to facilitate a wireless connection between the drone 52 and the playback device 54 that does not introduce lags and/or delay.

The apparatus 100 may be configured to reduce a bitrate of portions of the video while providing a high quality video to a viewer. The apparatus 100 may be implemented to enable a wireless transmission of the cropped portion of a panoramic video signal that may be played back smoothly using the playback device 54 (e.g., limited delay and/or buffering of the panoramic video).

The system 50 may be a peer-to-peer implementation. The drone 52 (using the wireless communication device 58) may form a peer-to-peer connection with the playback device 54. In an example, the video may be generated by components of the drone 52 (e.g., the apparatus 100), cropped and/or enhanced on the drone 52 and transmitted directly from the drone 52 to the playback device 54. To implement the peer-to-peer connection, the apparatus 100 may be configured to generate the video from the video streams captured by the camera 60 on-board the drone 52.

To implement the communication of a selected region of interest of a panoramic video, the apparatus 100 may be configured to perform intelligent video analytics on the panoramic video frames. The apparatus 100 generally implements electronic image stabilization and horizon keeping in accordance with an embodiment of the invention to improve the accuracy of the video analytics. The improved video analytics accuracy may allow smarter field of view selection and/or cropping, which may also reduce bandwidth needed to transmit the video. The apparatus 100 may be configured to select the region of interest and/or dynamically adjust the region of interest for one or more upcoming frames of the panoramic video stream corresponding to objects detected and/or recognized and/or being tracked in the video frames. The apparatus 100 may encode and/or enhance the region of interest (e.g., to provide a high quality video).

Figure 2:
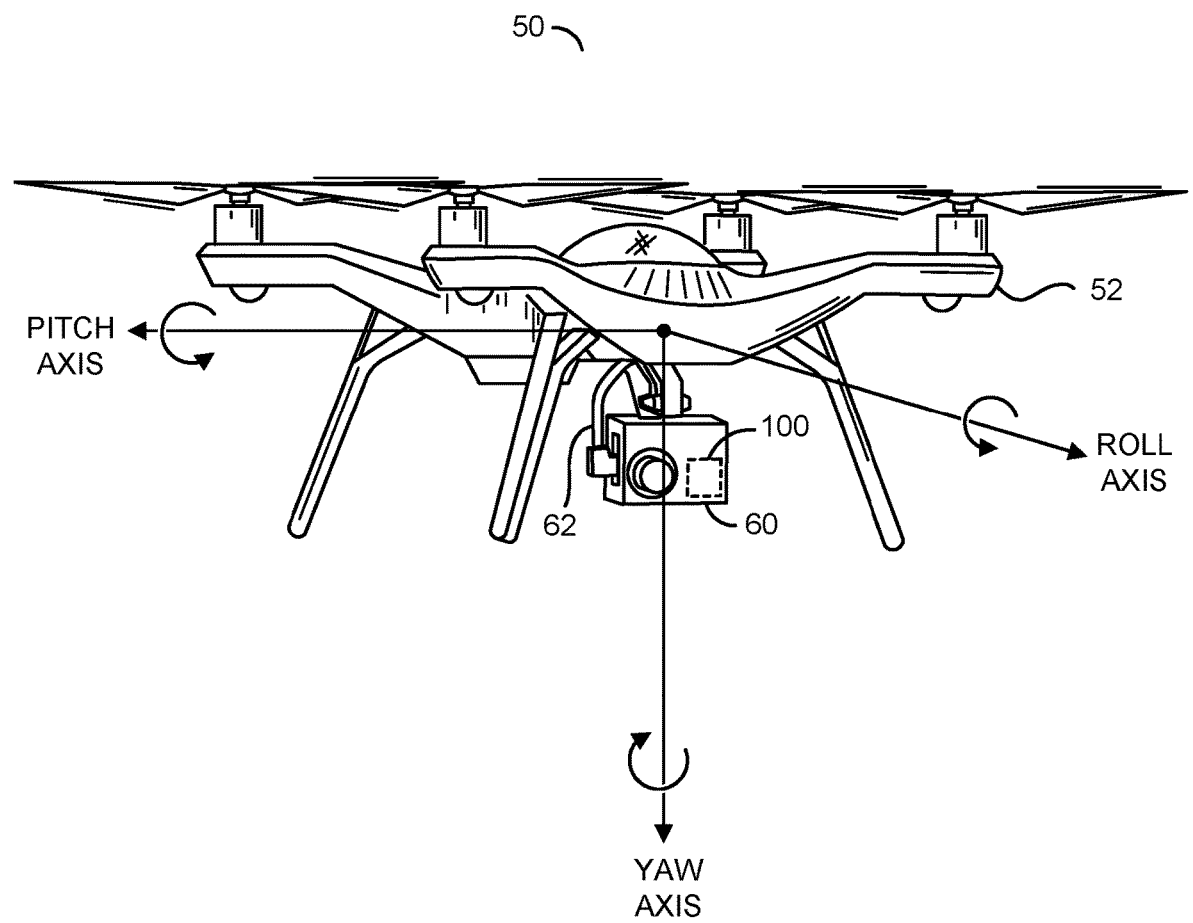
FIG. 2 is a diagram illustrating motion axis conventions for flying objects.

Referring to FIG. 2, a diagram of the drone 52 is shown illustrating conventional principle axes of an aerial vehicle. An aerial vehicle in flight is free to rotate in three dimensions: pitch, nose up or down about an axis running from wing to wing; yaw, nose left or right about an axis running up and down; and roll, rotation about an axis running from nose to tail. These axes move with the vehicle and rotate relative to the Earth along with the aerial vehicle. These rotations are produced by torques (or moments) about the principal axes. On a drone, these are intentionally produced by means of varying propeller speeds, which vary the distribution of the net aerodynamic force about the center of mass of the drone.

The vertical axis, normal axis, or yaw axis is an axis drawn from top to bottom, and perpendicular to the other two axes. The lateral axis, transverse axis, or pitch axis is an axis running from the left side to right to the right side of an aircraft, and parallel to the wings of a winged aircraft. The longitudinal axis, or roll axis is an axis drawn through the body of the vehicle from tail to nose in the normal direction of flight. These axes are generally represented by the letters X, Y and Z in order to compare them with some reference frame, usually named x, y, z. In general, the association is made in such a way that the X is used for the longitudinal axis, but there are other possibilities to do it.

The vertical yaw axis is defined to be perpendicular to the wings and to the normal line of flight with its origin at the center of gravity and directed towards the bottom of the aircraft. Yaw moves the nose of the aircraft from side to side. A positive yaw, or heading angle, moves the nose to the right. On a plane, the rudder is the primary control of yaw.

The pitch axis (also called lateral or transverse axis) passes through the plane from wingtip to wingtip. Pitch moves the nose of the aircraft up and down. A positive pitch angle raises the nose and lowers the tail. On a plane, the elevators are the primary control of pitch. The roll axis (or longitudinal axis) passes through the plane from nose to tail. The angular displacement about the roll axis is called bank. On a plane, the pilot changes bank angle by increasing the lift on one wing and decreasing it on the other. On a drone, the pilot changes bank angle by increasing the lift from propellers on one side of the drone and decreasing the lift from propellers on the other side of the drone. A positive roll angle lifts the left side and lowers the right. On a plane, the ailerons are the primary control of bank. The rudder also has a secondary effect on bank.

Figure 3:
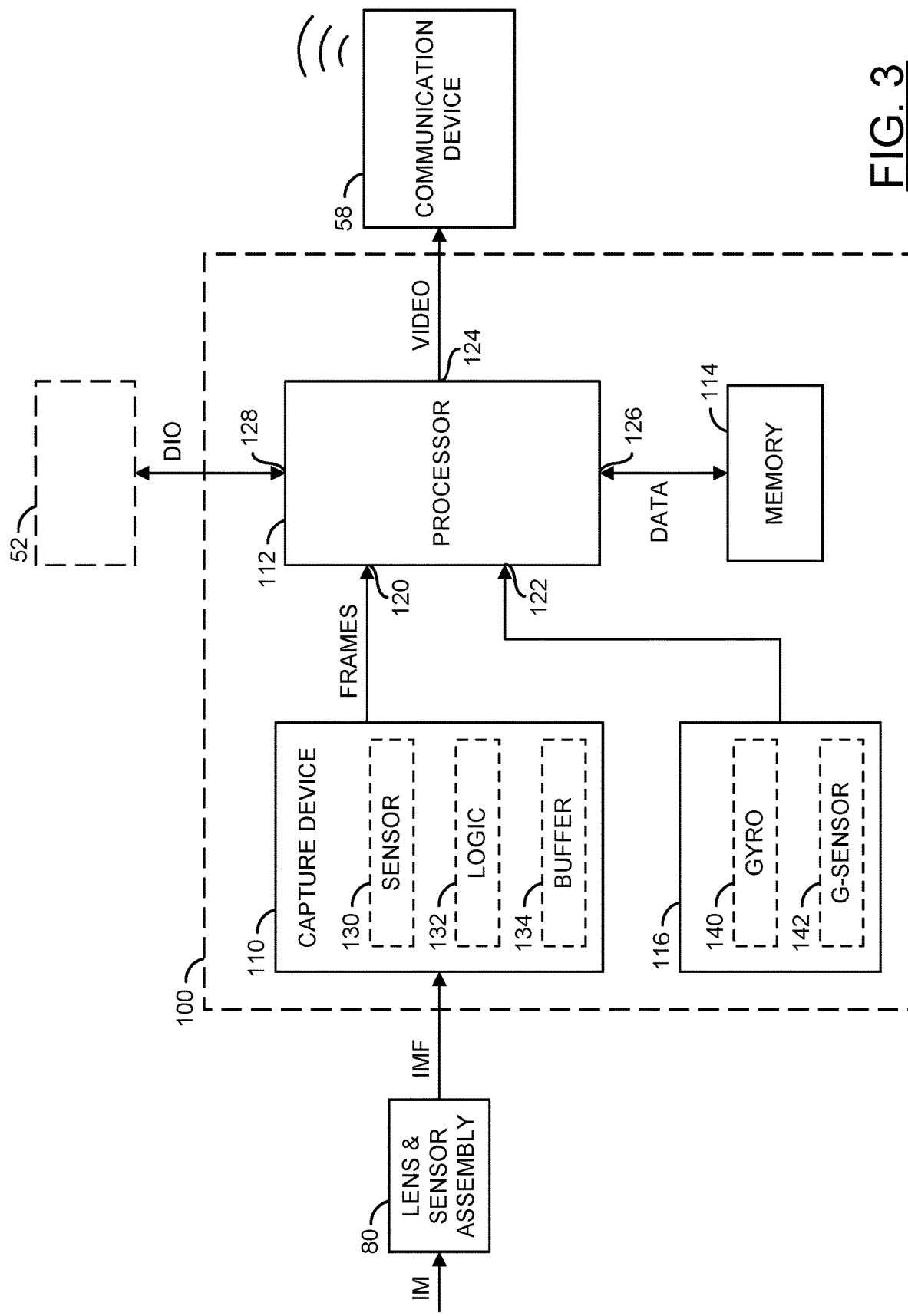
FIG. 3 is a block diagram illustrating an example embodiment of a system on chip for generating a video analytics in accordance with an example embodiment of the invention.

Referring to FIG. 3, a block diagram illustrating an example of a system on chip (SoC) for performing electronic image stabilization and horizon keeping and generating video analytics in accordance with an embodiment of the invention is shown. In various embodiments, the apparatus 100 comprises a block (or circuit) 110, a block (or circuit) 112, a block (or circuit) 114, and/or a block (or circuit) 116. The circuit 110 may be implemented as a capture device. The circuit 112 may be implemented as a processor. The circuit 114 may be implemented as a memory. The circuit 116 may implement fight (or motion detection) sensors (e.g., gyroscopic sensor, gravitational sensor, accelerometer, etc.). In an example implementation, the circuit 112 may be implemented as a video processor. The processor 112 may comprise an input 120, an input 122, and/or other inputs. The processor 112 may comprise an output 124 and/or other outputs. The processor 112 may comprise an input/output 126, an input/output 128, and/or other input/outputs.

In the embodiment shown, the capture device 110 may be implemented as a component of the apparatus 100. In some embodiments, the capture device 110 may be implemented as a separate device (e.g., part of the drone 52 and/or part of the camera 60). When the device 110 is implemented as a separate device, the capture device 110 may be configured to send data to the apparatus 100. Similarly, in some embodiments the flight sensors 116 may be implemented as a component of the apparatus 100 and in some embodiments the flight sensors 116 may be implemented as separate devices (e.g., part of the drone 52). In some embodiments, the wireless communication device 58 may be a component of the apparatus 100 and in some embodiments the wireless communication device 58 may be a separate device (e.g., part of the drone 52).

The apparatus 100 may receive a signal (e.g., IMF). The apparatus 100 may present a signal (e.g., VIDEO). The capture device 110 may receive the signal IMF from a corresponding lens assembly 80 of the camera 60. The apparatus 100 may present the signal VIDEO to the communication device 58. For example, the wireless communication device 58 may be a radio-frequency (RF) transmitter. In another example, the communication device 58 may be a Wi-Fi module. In another example, the communication device 58 may be a device capable of implementing RF transmission, Wi-Fi, BLUETOOTH and/or other wireless communication protocols.

The camera 60 may capture a signal (e.g., IM). The signal IM may be an image (e.g., an analog image) of the environment near the drone 52 that is in view of the camera 60. The lens assembly 80 may present the signal IM to the capture device 110 as the signal IMF. The camera 60 may be implemented with an optical lens. The camera 60 may provide a zooming feature and/or a focusing feature. The capture device 110 and the lens assembly 80 of the camera 60 may be implemented, in one example, as a single lens and sensor assembly. In another example, the lens assembly 80 of the camera 60 may be a separate implementation from the capture device 110. The capture device 110 is shown within the circuit 100. In an example implementation, the capture device 110 may be implemented outside of the circuit 100 (e.g., along with the camera 60 as part of a lens/capture device assembly).

The capture device 110 may be configured to capture image data for video (e.g., the signal IMF from the camera 60). The capture device 110 may capture data received through the camera 60 to generate a bitstream (e.g., generate video frames). For example, the capture device 110 may receive sampled values of focused light from the camera 60. The camera 60 may be directed, tilted, panned, zoomed and/or rotated to provide a targeted view from the drone 52 (e.g., to provide coverage for a field of view). The capture device 110 may generate a signal (e.g., FRAMES). The signal FRAMES may be video data (e.g., a sequence of video frames). The signal FRAMES may be presented to the input 120 of the processor 112.

The capture device 110 may transform the received image data signal IMF into digital data (e.g., a bitstream). In some embodiments, the capture device 110 may perform an analog to digital conversion. The capture device 110 may transform the bitstream into video data, video files and/or video frames. In some embodiments, the video data generated by the capture device 110 may be uncompressed and/or raw data generated in response to the image data. In some embodiments, the video data may be digital video signals. The video signals may comprise video frames. In some embodiments, the video data may be encoded at a high bitrate. For example, the signal may be generated using a lossless compression and/or with a low amount of lossiness. The apparatus 100 may encode the video data captured by the capture device 110 to generate the signal VIDEO.

In some embodiments, the apparatus 100 may further comprise an audio capture device (e.g., a microphone). The audio capture device may capture audio of the environment. The apparatus 100 may be configured to synchronize the audio captured with the images captured by the capture device 110.

The processor 112 may receive the signal FRAMES from the capture device 110 at the input 120 and/or a signal (e.g., DATA) from the memory 114 at the input/output 126. The processor 112 may send/receive a signal (e.g., DIO) at the input/output 128 (e.g., tp/from the drone 52). The processor 112 may be connected through a bi-directional interface (or connection) to components of the drone 52, the capture device 110, to the communication device 58, and/or to the memory 114. The processor 112 may store data to and/or retrieve data from the memory 114. The memory 114 may be configured to store computer readable/executable instructions (or firmware). The instructions, when executed by the processor 112 may perform a number of steps, including steps associated with electronic image stabilization, horizon keeping, and/or intelligent video analytics in accordance with an embodiment of the invention.

The processor 112 may be configured to receive the signal FRAMES, the signal DATA, the signal DIO and/or other inputs. The signal FRAMES may comprise video data (e.g., one or more video frames) providing a field of view captured by the camera 60. The processor 112 may be configured to generate the signal VIDEO and/or other signals (not shown). The signal VIDEO may be generated based on one or more decisions made and/or functions performed by the processor 112. The decisions made and/or functions performed by the processor 112 may be determined based on data received by the processor 112 at the input 120 (e.g., the signal FRAMES), the input 122, and/or other inputs.

The input 120, the input 122, the output 124, the input/output 126, the input/output 128 and/or other inputs/outputs may implement an interface. The interface may be implemented to transfer data to/from the processor 112, the communication device 58, the capture device 110, the memory 114, the sensors 116, and/or other components of the apparatus 100 and/or the drone 52. In one example, the interface may be configured to receive (e.g., via the input 120) the video stream FRAMES from the capture device 110. In yet another example, the interface may be configured to output one or more upcoming video frames (e.g., the signal VIDEO) to the communication device 58. The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal VIDEO may be presented to the communication device 58. The signal VIDEO may be an encoded, cropped, stitched and/or enhanced version of the signal FRAMES. The signal VIDEO may be a high resolution, digital, encoded, de-warped, stabilized, cropped, blended, stitched and/or rolling shutter effect corrected version of the signal FRAMES. In some embodiments, the apparatus 100 may be configured to balance an amount of time needed to generate the signal VIDEO with the visual quality of the signal VIDEO.

The apparatus 100 may implement a camera system. In some embodiments, the camera system 100 may be implemented as a drop-in solution (e.g., installed as one component). In an example, the camera system 100 may be a device that may be installed as an after-market product for the drone 52 (e.g., a retro-fit for the drone 52). In some embodiments, the apparatus 100 may be a component of the camera 60. The number and/or types of signals and/or components implemented by the camera system 100 may be varied according to the design criteria of a particular implementation.

The video data of the targeted view from the drone 52 may be represented as the signal/bitstream/data FRAMES (e.g., a video signal). The capture device 110 may present the signal FRAMES to the input 120 of the processor 112. The signal FRAMES may represent the video frames/video data. The signal FRAMES may be a video stream captured by the capture device 110. In some embodiments, the capture device 110 may be implemented in the camera 60. In some embodiments, the capture device 110 may be configured to add to existing functionality to the camera 60.

The capture device 110 may comprise a block (or circuit) 130, a block (or circuit) 132, and/or a block (or circuit) 134. The circuit 130 may implement a camera sensor interface. The circuit 132 may implement a camera processor/logic. The circuit 134 may implement a memory buffer. As a representative example, the capture device 110 is shown comprising the sensor interface 130, the logic block 132 and the buffer 134. In some embodiments, the camera sensor interface 130 may receive analog image data from the camera 60 and transform the image data into digital data (e.g., the bitstream).

The apparatus 100 may further comprise the interface 128 configured to send/receive data (e.g., the signal DIO)

to/from one or more components of the drone 52, the pilot 70 and/or other components of the camera system 100. The interface 128 may be configured to send data (e.g., instructions) from the processor 112 to the components of the drone 52 and receive data (e.g., telemetry, etc.) from the drone 52 to the processor 112. For example, the interface 128 may be bi-directional. In an example, data presented to the interface 128 may be used by the processor 112 to determine the movement of the drone 52 (e.g., to provide information to perform image stabilization, to calculate movements to determine expected rotations of objects detected by the processor 112 and/or to determine flight control output).

The interface 122 may receive information from a gyroscope sensor, information from an inertial measurement unit, information from one or more components of the drone 52, etc. In an example, the signal DIO may comprise information from the components of the drone 52 that may be used to calculate telemetry data that may be compared to telemetry information calculated by the processor 112 by analyzing the video data captured (e.g., detecting and/or measuring the horizon captured in the video data). The type of data and/or the number of components of the drone 52 that provide data may be varied according to the design criteria of a particular implementation.

The processor 112 may be configured to execute computer readable code and/or process information. The processor 112 may be configured to receive input from and/or present output to the memory 114. The processor 112 may be configured to present and/or receive other signals (not shown). The number and/or types of inputs and/or outputs of the processor 112 may be varied according to the design criteria of a particular implementation.

The processor 112 may receive the signal FRAMES, the signal DIO and/or the signal DATA. The processor 112 may make a decision based on data received at the input 120, the input 122, the input 126, the input 128 and/or other inputs. For example other inputs may comprise external signals generated in response to user input, external signals generated by the drone 52 and/or internally generated signals such as signals generated by the processor 112 in response to analysis of the signal FRAMES and/or objects detected in the signal FRAMES. The processor 112 may adjust the video data (e.g., crop, digitally move, physically move the camera sensor 130, etc.) of the signal FRAMES. The processor 112 may generate the signal VIDEO in response data received by the input 120, the input 122, the input 124, the input 126, and/or the decisions made in response to the data received by the inputs 120, the input 122, the input 126, and/or the input 128.

The signal VIDEO may be generated to provide an output for the communication device 58 in response to the captured video frames (e.g., the signal FRAMES) and the video analytics performed by the processor 112. For example, the video analytics may be performed by the processor 112 in real-time and/or near real-time (e.g., with minimal delay). The signal VIDEO may be a live (or nearly live) video stream. The signal VIDEO may be transmitted to the playback device 54 (e.g., using RF communication) to provide the pilot 70 with a cropped view of the panoramic video captured from the perspective of the drone 52.

Generally, the signal VIDEO may correspond to the data received at the input 120, the input 122, the input 124, the input 126, the input 128, and/or enhanced (e.g., stabilized, corrected, cropped, downscaled, packetized, compressed, etc.) by the processor 112. For example, the signal VIDEO may be a stitched, corrected, stabilized, cropped and/or encoded version of the signal FRAMES. The processor 112 may further encode and/or compress the signal FRAMES to generate the signal VIDEO.

The cropping, downscaling, blending, stabilization, packetization, encoding, compression and/or conversion performed by the processor 112 may be varied according to the design criteria of a particular implementation. For example, the signal VIDEO may be a processed version of the signal FRAMES configured to fit the target area to the shape and/or specifications of the playback device 54 and/or to emulate a view from the perspective of the drone 52. For example, the playback device 54 may be implemented for real-time video streaming of the signal VIDEO received from the apparatus 100.

Generally, the signal VIDEO is some view (or derivative of some view) captured by the capture device 110. The signal VIDEO may comprise a portion of the video captured by the capture device 110. The signal VIDEO may be a video frame comprising the region of interest selected and/or cropped from the video frame by the processor 112. The signal VIDEO may have a smaller size than the video frames FRAMES. In some embodiments, the signal VIDEO may provide a series of cropped and/or enhanced panoramic video frames that improves upon the view from the perspective of the drone 52 (e.g., provides night vision, provides High Dynamic Range (HDR) imaging, provides more viewing area, highlights detected objects, provides additional data such as a numerical distance to detected objects, provides visual indicators for paths of a race course, etc.).

The memory 114 may store data. The memory 114 may be implemented as a cache, flash memory, DRAM memory, etc. The type and/or size of the memory 114 may be varied according to the design criteria of a particular implementation. The data stored in the memory 114 may correspond to a video file, status information (e.g., readings from the components of the drone 52, pre-selected fields of view, user preferences, user inputs, etc.) and/or metadata information.

The communication device 58 may send and/or receive data to/from the apparatus 100. In some embodiments, the communication device 58 may be implemented as a wireless communications module. In some embodiments, the communication device 58 may be implemented as a satellite connection to a proprietary system. In one example, the communication device 58 may be a hard-wired data port (e.g., a USB port, a mini-USB port, a USB-C connector, HDMI port, an Ethernet port, a DisplayPort interface, a Lightning port, etc.). In another example, the communication device 58 may be a wireless data interface (e.g., Wi-Fi, BLUETOOTH, ZIGBEE, cellular, etc.).

Data from the components of the drone 52 may be presented to the apparatus 100 at the input 128 as the signal DIO. The number and/or types of the components of the drone 52 may be varied according to the design criteria of a particular implementation. The data from the components of the drone 52 may be used by the camera system 100 to determine a movement direction of the drone 52. In one example, location-related information may be determined by a location module (e.g., to determine weather conditions for the current location of the drone 52). For example, the location module may be implemented as a GPS sensor. Orientation information may be determined by an orientation module. For example, the orientation module may be implemented as a magnetometer, an accelerometer and/or a gyroscope. In yet another example, temperature information may be determined by a temperature module. For example, the temperature module may be implemented as a thermometer. The types of the components of the drone 52 used to implement the location module, the orientation module, the temperature module and/or any other types of sensors may be varied according to the design criteria of a particular implementation.

Different communication channels may be implemented to transmit video and drone control. In an example, the communication module 58 may implement one communication channel to transmit video and a different communication channel for drone control (e.g., movements input by the pilot 70 using the remote control 56). In another example, the drone 52 may comprise the communication module 58 to implement one channel to transmit the signal VIDEO and a separate remote-control (RC) transmitter to implement a different channel for drone control. Example frequencies may comprise 900 MHz, 1.2 GHz, 2.4 GHz and/or 5.8 GHz. In an example, if the drone 52 uses a RC transmitter on one of the frequencies for control, then, in order to avoid interference, another one of the frequencies should be selected for the communication module 58. In some embodiments, an option may be provided to select a sub-frequency for each pilot. In some embodiments, the wireless communication module 58 may automatically select a sub-frequency for each pilot. For example, many video transmitters operate at 5.8 GHz. Other frequencies may be implemented. The channels used for a particular type of communication (e.g., video, region of interest data or control) and/or the frequencies used may be varied according to the design criteria of a particular implementation.

In some embodiment, the apparatus 100 may perform video stitching operations on the signal FRAMES. In one example, each of the video signal FRAMES may provide a portion of a panoramic view and the processor 112 may crop, blend, synchronize and/or align the signal FRAMES to generate the panoramic video signal VIDEO. The processor 112 may perform de-warping on the signal FRAMES. In various embodiments, the processor 112 may be configured to perform electronic image stabilization (EIS) and horizon keeping. The processor 112 may perform intelligent video analytics on the de-warped and stabilized video frames in the signal FRAMES. The processor 112 may encode the signal FRAMES to a particular format.

The cropped and/or enhanced video generated by the processor 112 may be sent to the output 124 (e.g., the signal VIDEO). In one example, the signal VIDEO may be an HDMI output. In another example, the signal VIDEO may be a composite (e.g., NTSC) output (e.g., composite output may be a low-cost alternative to HDMI output). In yet another example, the signal VIDEO may be a S-Video output. In some embodiments, the signal VIDEO may be an output sent via interfaces such as USB, SDIO, Ethernet and/or PCIe. The video signal VIDEO may be output to the wireless communication device 58. In an example, the wireless communication device 58 may be a RF (radio frequency) transmitter.

The video generated by the processor 112 may implement high-quality video in the region of interest. The video generated by the processor 112 may be used to implement a reduced bandwidth needed for transmission by cropping out a portion of the video that has not been selected by the intelligent video analytics as the region of interest. To generate a high-quality, enhanced video using the region of interest, the processor 112 may be configured to perform encoding, blending, cropping, aligning and/or stitching.

The encoded video may be stored locally and/or transmitted wirelessly to external storage (e.g., network attached storage, cloud storage, etc.). In an example, the encoded, panoramic video may be stored locally by the memory 114.

In another example, the encoded, panoramic video may be stored to a hard-drive of a networked computing device. In yet another example, the encoded, panoramic video may be transmitted wirelessly without storage. The type of storage implemented may be varied according to the design criteria of a particular implementation.

The processor 112 may be configured to send analog and/or digital video (e.g., the signal VIDEO) to the video communication device 58. In some embodiments, the signal VIDEO generated by the apparatus 100 may be a composite and/or HDMI output. The processor 112 may receive an input for the video signal (e.g., the signal FRAMES) from the sensor interface 130. The input video signal FRAMES may be enhanced by the processor 112 (e.g., color conversion, noise filtering, auto exposure, auto white balance, auto focus, etc.).

Figure 4:
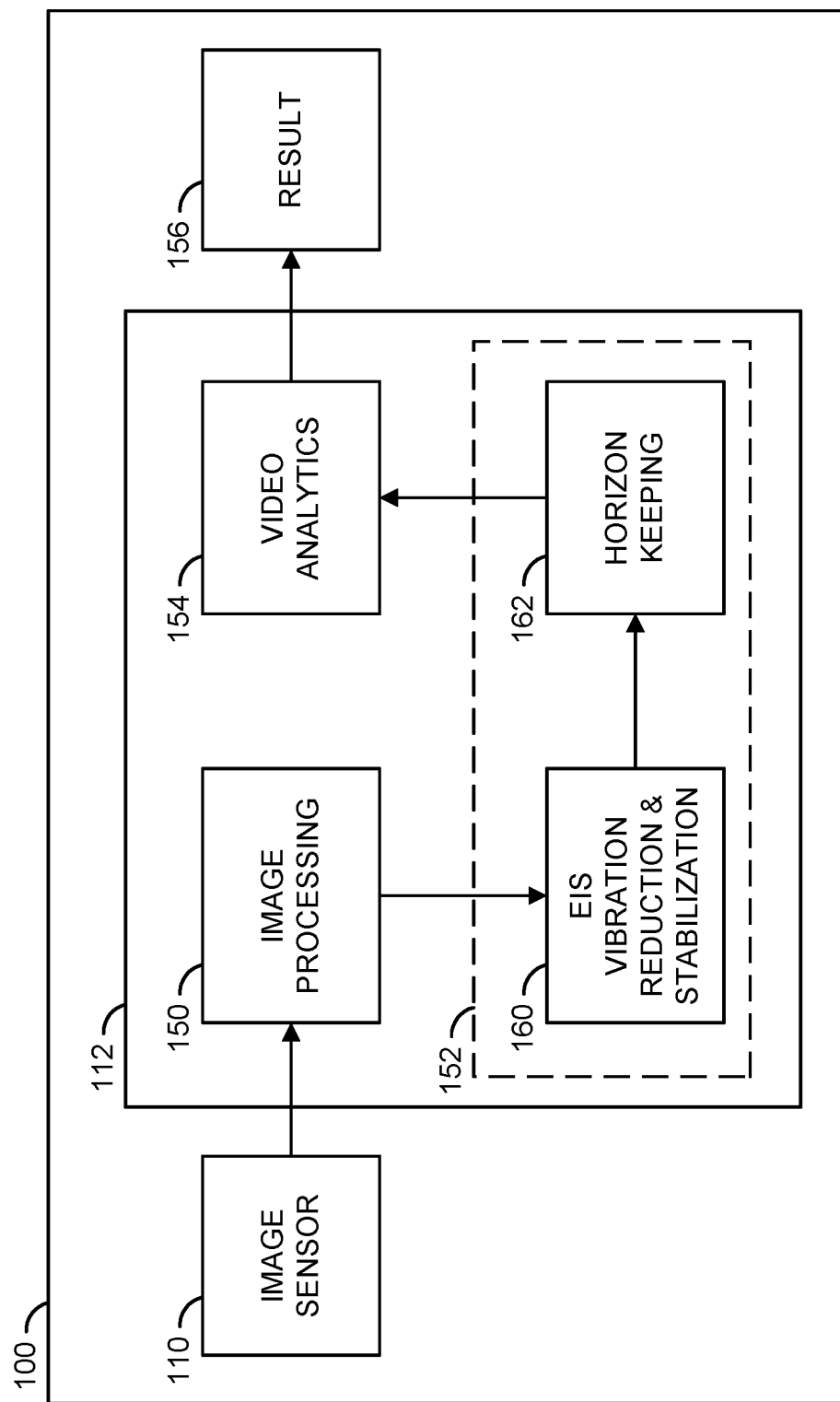
FIG. 4 is a flow diagram illustrating an image processing scheme in accordance with an example embodiment of the invention.

Referring to FIG. 4, a diagram is shown illustrating an improved image processing flow in accordance with an example embodiment of the invention. The improved image processing flow may be implemented by the processor 112. In various embodiments, the processor 112 may be implemented as a digital signal processor (DSP). In an example, the digital signal processor may be implemented as a plurality of hardware units that may be configured (programmed) to implement an image processing pipeline. In an example, the plurality of hardware units may be configured to implement an improved image processing flow including (i) an image processing phase 150, (ii) an electronic image stabilization (EIS) and horizon keeping phase 152, and (iii) a video analytics phase 154. The image processing pipeline may be implemented using a combination of the hardware units and software to achieve real-time correction performance on high-resolution, high frame-rate video with a low latency.

In various embodiments, the EIS and horizon keeping phase 152 generally improves the accuracy of results 156 produced by the video analytics phase 154, especially in drone applications. In various embodiments, the (EIS) and horizon keeping phase 152 comprises an EIS portion 160 and a horizon keeping portion 162. In various embodiments, the EIS portion 160 and the horizon keeping portion 162 may be implemented using a combination of hardware and software to achieve real-time correction performance on high-resolution, high frame-rate video with low delay. The EIS portion 160 generally performs vibration correction and image stabilization to ensure the images are as clear as possible (e.g., without blur, etc.) for processing by the video analytics phase 154. The horizon keeping portion 162 generally maintains a substantially horizontal orientation of the image (e.g., compensated for roll, etc.) so the orientation of objects are in a proper position for improved video analytics.

In various embodiments, the electronic image stabilization and horizon keeping phase 152 may be combined with the video analytics (e.g., object tracking, motion tracking, face tracking) phase 154 to allow the algorithms to work reliably in drone designs that do not use a gimbal. Combining electronic image stabilization and horizon keeping processing with the video analytics generally enables the video analytics feature(s) to work with much higher accuracy relative to conventional designs.

In various embodiments, the intelligent video analytics performed by the video analytics phase 154 may comprise analyzing, understanding and/or interpreting digital video to produce numerical and/or symbolic information about the digital video. The numerical and/or symbolic information may be used for interpreting visual information about the digital video. In an example, the intelligent video analytics may comprise computer vision.

In some embodiments, the video analytics module 154 may be configured to extract data (e.g., the numerical and/or symbolic information) from the stabilized video signal. The extracted data may be used to determine the visual content of the stabilized video. Determining the visual content may comprise recognizing objects (e.g., faces, etc.). In one example, the video analytics phase 154 may interpret the numerical and/or symbolic information to recognize that the visual data represents, for example, a person. In some embodiments, the number of pixels and/or the colors of the pixels of the stabilized video signal may be used to recognize portions of the stabilized video signal as particular objects (e.g., faces, etc.). The types of objects recognized during the video analytics phase 154 may be varied according to the design criteria of a particular implementation.

In some embodiments, the memory 114 may store numerical and/or symbolic information of known objects (e.g., the shapes/colors associated with a person, the shapes/colors associated with a vehicle, the shapes/colors associated with animals, etc.). The video analytics phase 154 may receive the information associated with known objects from the memory 114 via the signal DATA. The video analytics phase 154 may compare the information in the signal DATA with the numerical and/or symbolic information extracted from the stabilized video signal. The video analytics phase 154 may select the region of interest of the panoramic video based on the detected objects.

The intelligent video analytics phase 154 may comprise one or more functions. In one example, one of the functions implemented as part of the intelligent video analytics phase 154 may be a "person detection". The video analytics phase 154 may identify a particular person in the video frame. In another example, one of the functions implemented as part of the intelligent video analytics phase 154 may be a "follow me" function. The video analytics phase 154 may recognize a particular object over multiple video frames (e.g., from one frame to a future frame) and follow the object. For example, the video analytics phase 154 may identify a person and follow the identified person. In another example, the video analytics phase 154 may identify the drone pilot 70. In yet another example, the video analytics phase 154 may follow an identified player as the player engages in a sporting activity.

Figure 5:
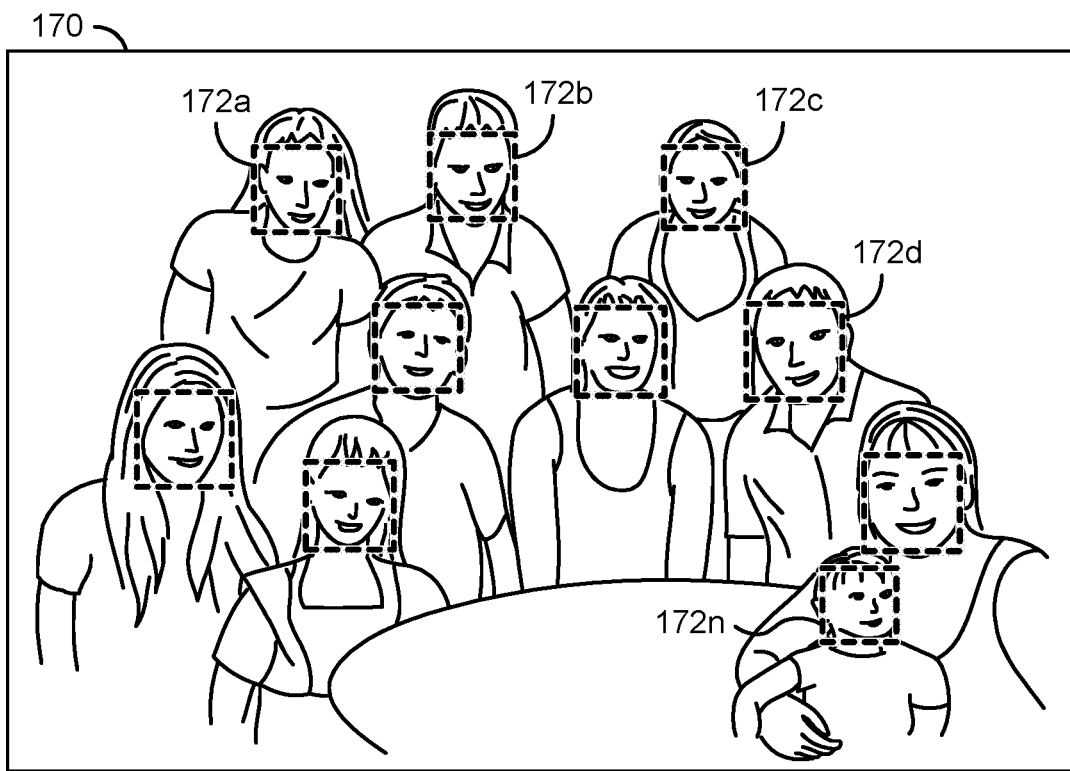
FIG. 5 is a diagram illustrating an example result of running a face detection algorithm to detect a face or faces in an image.

Referring to FIG. 5, a diagram of a still picture 170 is shown illustrating an example operation of a face detecting video analytic. In the field of image processing, video analytics techniques typically operate under an assumption of an object or object in a captured source image having a particular orientation. For example, in the picture 170, a digital still camera is running a face detection algorithm to detect faces in the image. In various embodiments, frames 172a-172n may be superimposed over the picture 170 to indicate detected faces.

Figure 6:
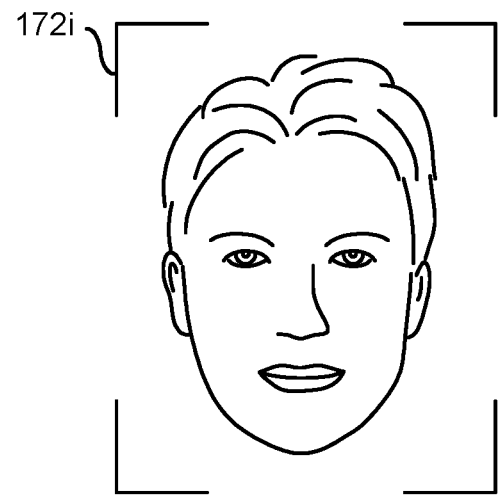
FIG. 6 is a diagram illustrating a pattern used in a face detection scheme in accordance with an example embodiment of the invention.

Referring to FIG. 6, a diagram is shown illustrating an example template that may be used by a face detecting video analytic. Technically, the video analytic algorithms operate on pattern matching of a particular feature or features. In an example face detection scheme, a face within a frame 172i may be recognized based on the location and correlation of hair, eyes, mouth, nose, and ears. The location and correlation is generally based on predetermined patterns and assumptions (e.g., orientation with respect to the horizon).

Figure 7:
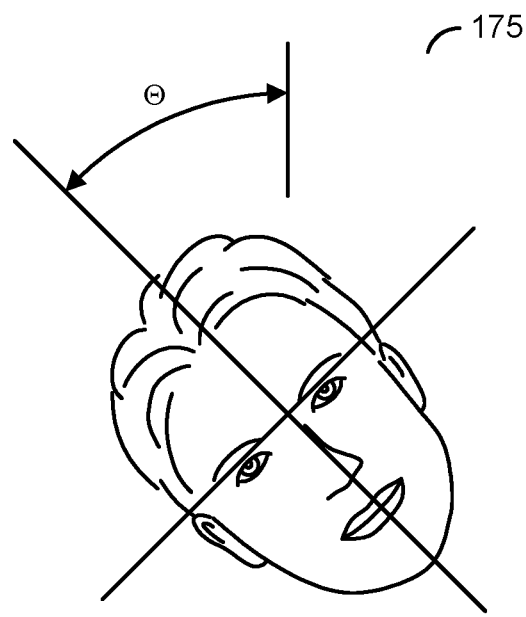
FIG. 7 is a diagram illustrating an example where an image capture device fails to maintain an appropriate orientation on a target face.

Referring to FIG. 7, a diagram is shown illustrating failure of a face detecting video analytic. If the image captured by a device does not maintain a good orientation of the target face, the face detection algorithm likely will fail to detect the face and, hence, cannot work. For example if, in a captured image 175, a face is tilted sideways (as illustrated in FIG. 7), face recognition techniques based on predetermined patterns and assumptions may fail.

Typically, in a handheld camera the tilted condition might not happen because a consumer would adjust the camera by hand to maintain the captured image stable and in a proper orientation. However, in the world of drones (or flying cameras), with the vibration from propeller as well as the movement of the drone due to flying or other natural influences (e.g., such as a strong wind), the camera may likely capture rotated images, or images with strong vibration. Both pose challenging conditions for video analytics algorithms to work reliably.

One way to solve the problem is to adopt the mechanical gimbal system that is commonly used in high-end video recording system. Such systems use gimbals to ensure the video captured always has a proper orientation, and hence is free from any tilt, rotation or vibration. However such a gimbal system is big, expensive and hard to adopt for various application where a smaller design is desired. Instead, a method in accordance with an embodiment of the invention may be implemented that combines EIS and horizon keeping to improve the video analytics results without incurring the additional costs of the complicated gimbal system.

Figure 8:
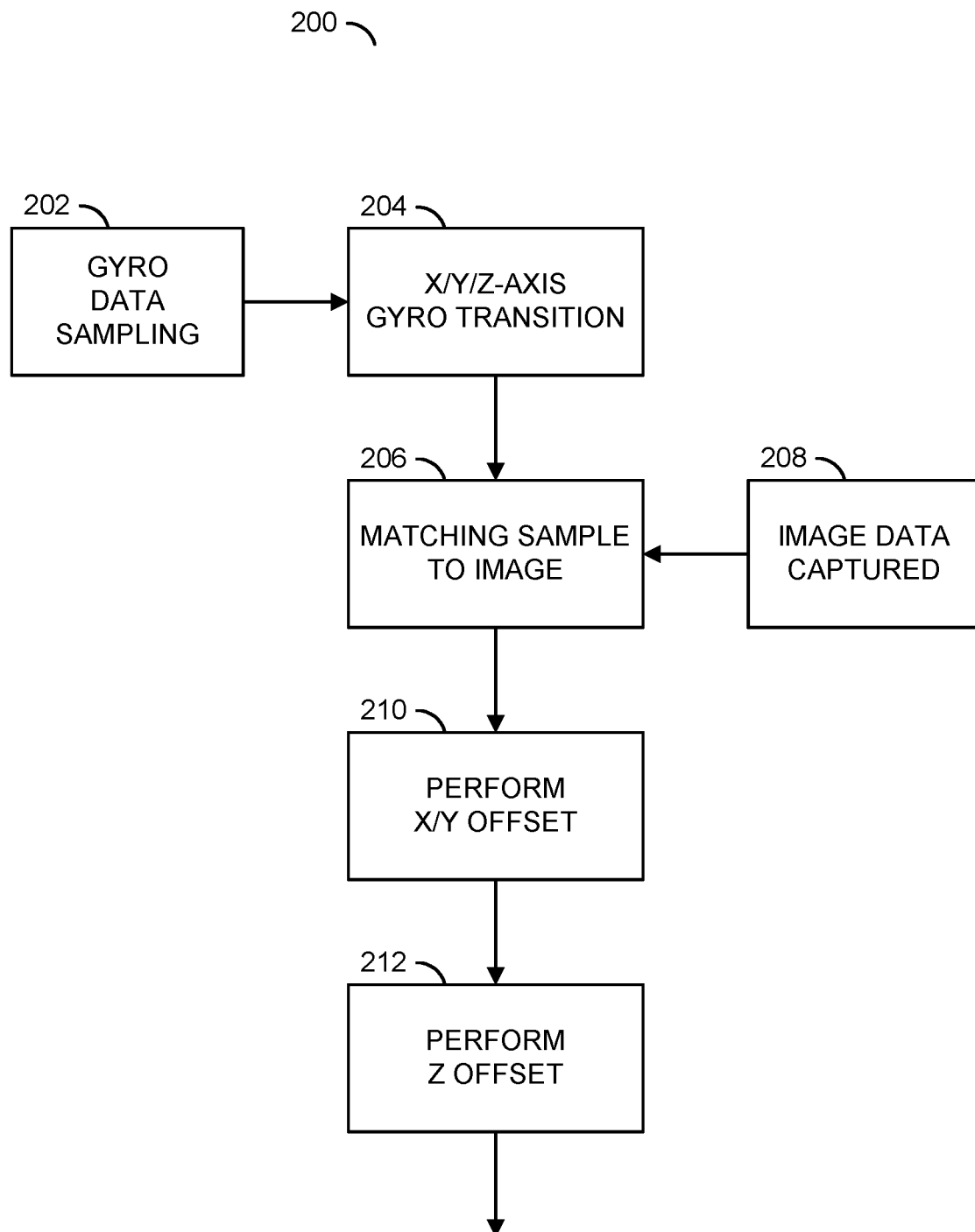
FIG. 8 is a diagram illustrating an electronic image stabilization process in accordance with an embodiment of the invention.

Referring to FIG. 8, a diagram of a process 200 is shown illustrating an electronic image stabilization process in accordance with an example embodiment of the invention. In various embodiments, the process (or method) 200 may comprise a step (or stage) 202, a step (or stage) 204, a step (or stage) 206, a step (or stage) 208, a step (or stage) 210, and a step (or stage) 212. In the step 202, the process 200 may sample data from a gyroscopic sensor of the drone 52. In the step 204, the process 200 may detect X/Y/Z axes transitions. In the steps 206 and 208, the process 200 may match axis transition samples with captured image data. In the step 210, the process 200 may compensate the captured image data for X/Y axis transitions by performing an X/Y offset. In the step 212, the process 200 may compensate the captured image data for Z axis transitions by performing a Z offset. The process 200 may be used to implement the electronic image stabilization portion 160. When the image data has been compensated, the compensated image data may be passed from the electronic image stabilization portion 160 to the horizon keeping portion 162.

Figure 9:
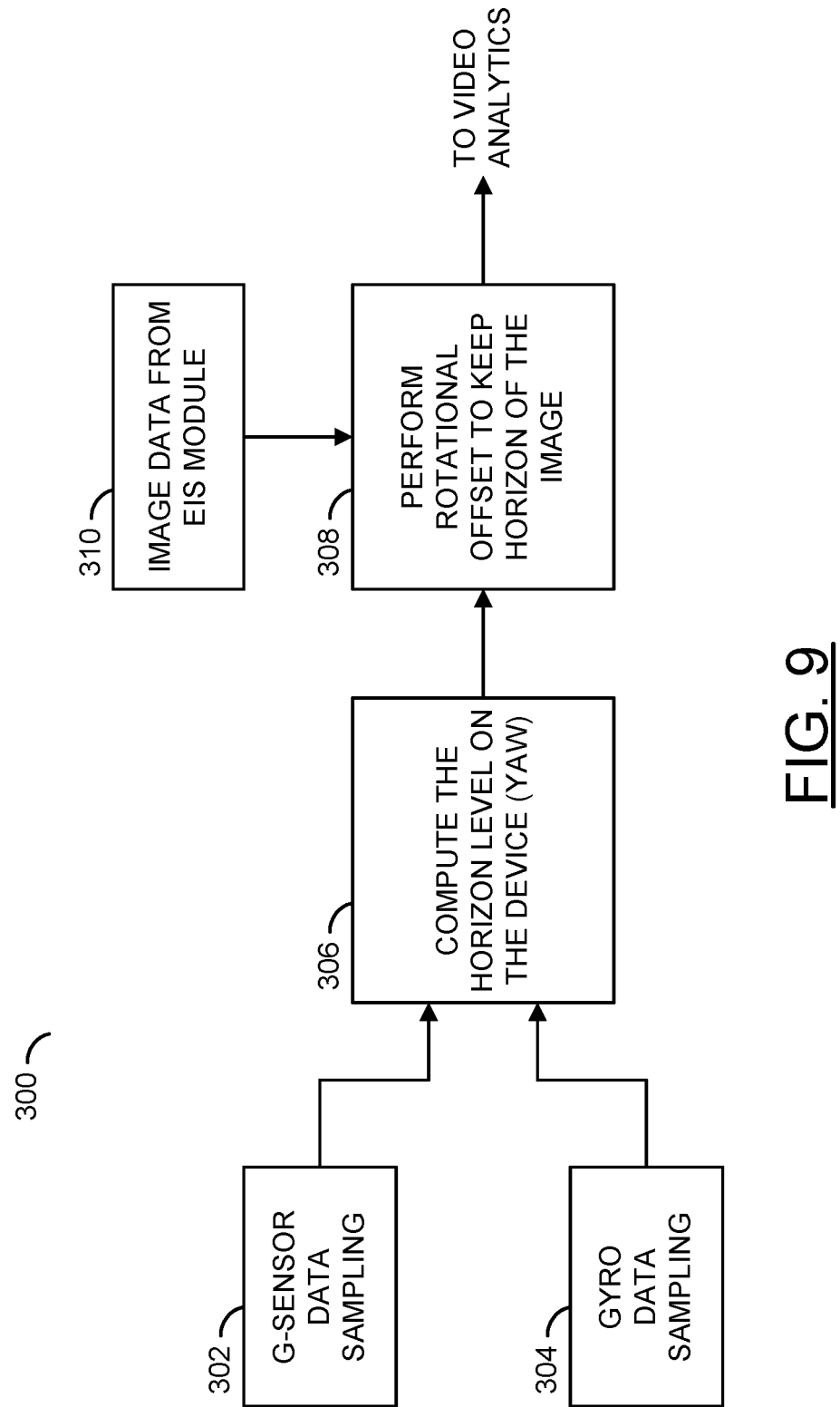
FIG. 9 is a diagram illustrating a horizon stabilization process in accordance with an embodiment of the invention.

Referring to FIG. 9, a diagram of a process 300 is shown illustrating a horizon keeping (stabilization) process in accordance with an example embodiment. In various embodiments, the process (or method) 300 may comprise a step (or stage) 302, a step (or stage) 304, a step (or stage) 306, and a step (or stage) 308. In the step 302, the process 300 collects G-sensor data samples. In the step 304, the process 300 collects gyroscopic data samples. In the step 306, the process 300 computes the horizon level of the drone 52 (e.g., roll and pitch angles) based on the samples collected in the steps 302 and 304. In the step 308, the process 300 performs a rotational offset to maintain a horizon of the image represented by the image data received in the step 310 from the EIS portion 160. The process 300 may be used to implement the horizon keeping portion 162. When the image data has been compensated for orientation with the horizon, the compensated image data may be passed from the EIS and horizon keeping phase 152 to the video analytics phase 154.

Figure 10:
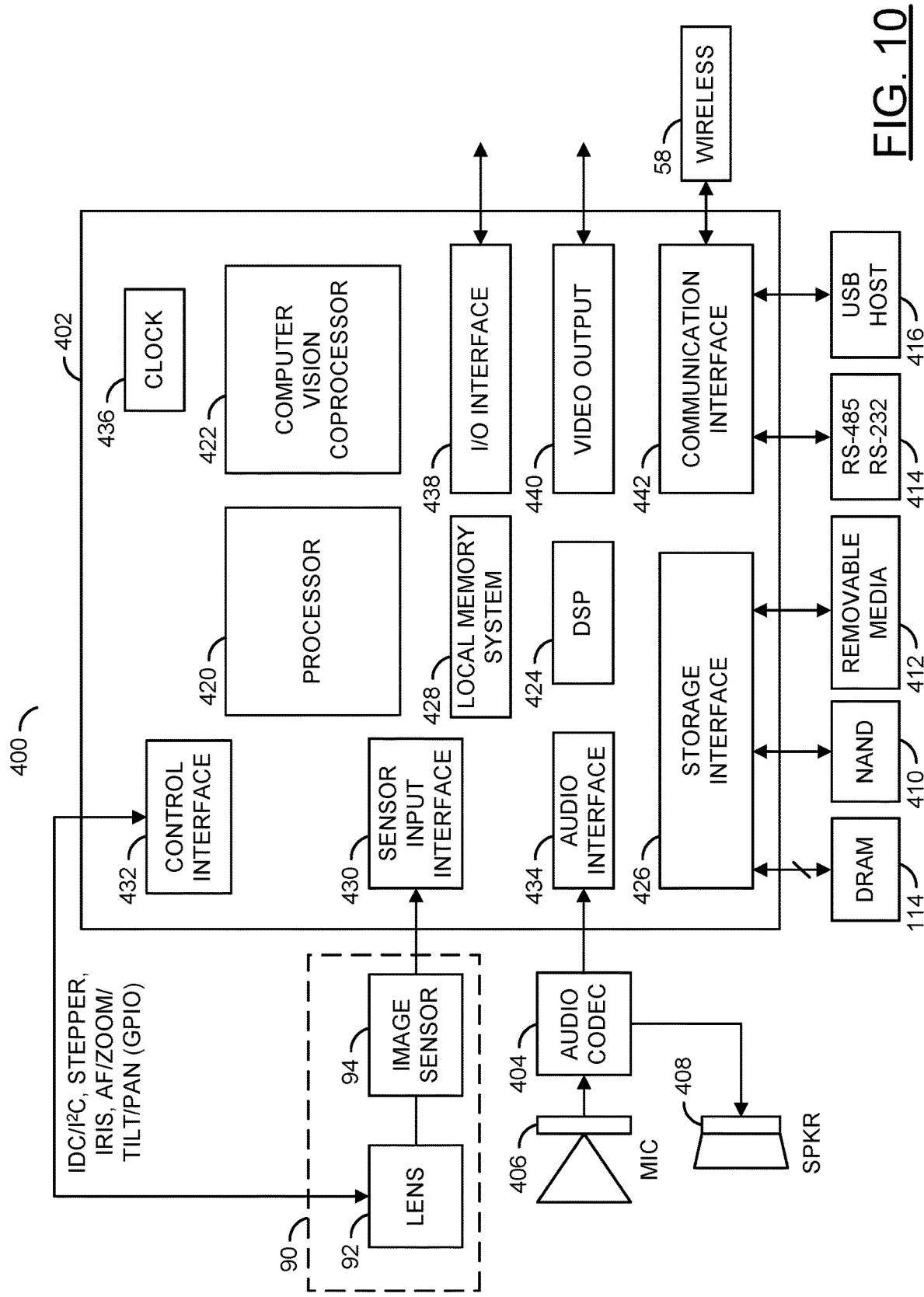
FIG. 10 is a diagram illustrating a system on chip (SoC) implementing an example embodiment of the invention.

Referring to FIG. 10, a diagram of a camera system 400 is shown illustrating an example implementation of a computer vision system in accordance with an embodiment of the present invention. In one example, the electronics of the camera system 400 may be implemented as one or more integrated circuits. In an example, the camera system 400 may be built around a processor/camera chip (or circuit) 402. In an example, the processor/camera chip 402 may be implemented as an application specific integrated circuit (ASIC) or system on chip (SOC). The processor/camera circuit 402 generally incorporates hardware and/or software/firmware that may be configured to implement the processors, circuits, and processes described above in connection with FIGS. 1-9.

In an example, the processor/camera circuit 402 may be connected to a lens and sensor assembly 90. In some embodiments, the lens and sensor assembly 90 may be a component of the processor/camera circuit 402 (e.g., a SoC component). In some embodiments, the lens and sensor assembly 90 may be a separate component from the processor/camera circuit 402 (e.g., the lens and sensor assembly may be an interchangeable component compatible with the processor/camera circuit 402). In some embodiments, the lens and sensor assembly 90 may be part of a separate camera connected to the processor/camera circuit 402 (e.g., via a video cable, a high definition media interface (HDMI) cable, a universal serial bus (USB) cable, an Ethernet cable, or wireless link).

The lens and sensor assembly 90 may comprise a block (or circuit) 92 and/or a block (or circuit) 94. The circuit 92 may be associated with a lens assembly. The circuit 94 may be an image sensor. The lens and sensor assembly 90 may comprise other components (not shown). The number, type and/or function of the components of the lens and sensor assembly 90 may be varied according to the design criteria of a particular implementation.

The lens assembly 92 may capture and/or focus light input received from the environment near the camera 60. The lens assembly 92 may capture and/or focus light for the image sensor 94. The lens assembly 92 may implement an optical lens. The lens assembly 92 may provide a zooming feature and/or a focusing feature. The lens assembly 92 may be implemented with additional circuitry (e.g., motors) to adjust a direction, zoom and/or aperture of the lens assembly 92. The lens assembly 92 may be directed, tilted, panned, zoomed and/or rotated to provide a targeted view of the environment near the camera 60.

The image sensor 94 may receive light from the lens assembly 92. The image sensor 94 may be configured to transform the received focused light into digital data (e.g., bitstreams). In some embodiments, the image sensor 94 may perform an analog to digital conversion. For example, the image sensor 94 may perform a photoelectric conversion of the focused light received from the lens assembly 92. The image sensor 94 may present converted image data as a color filter array (CFA) formatted bitstream. The processor/camera circuit 402 may transform the bitstream into video data, video files and/or video frames (e.g., human-legible content).

The processor/camera circuit 402 may also be connected to the memory 114, which may include dynamic random access memory (DRAM), the communication device 58, an optional audio input/output circuit including an audio codec 404, a microphone 406 and a speaker 408, non-volatile memory (e.g., NAND flash memory) 410, a removable media 412 (e.g., SD, SDXC, etc.), one or more serial (e.g., RS-485, RS-232, etc.) devices 414, and one or more universal serial bus (USB) devices (e.g., a USB host 416).

In various embodiments, the processor/camera circuit 402 may comprise a block (or circuit) 420, a block (or circuit) 422, a block (or circuit) 424, a block (or circuit) 426, a block (or circuit) 428, a block (or circuit) 430, a block (or circuit) 434, a block (or circuit) 436, a block (or circuit) 438, a block (or circuit) 440, and/or a block (or circuit) 442. The circuit 420 may be a processor circuit. In various embodiments, the circuit 420 may include one or more embedded processors (e.g., ARM, etc.). The circuit 422 may be may be a computer vision coprocessor circuit. The circuit 424 may be a digital signal processing (DSP) module. In some embodiments, the circuit 424 may implement separate image DSP and video DSP modules. The circuit 426 may be a storage interface. The circuit 426 may interface the processor/camera circuit 402 with the DRAM 114, the non-volatile memory 410, and the removable media 412.

The circuit 428 may implement a local memory system. In some embodiments, the local memory system 428 may comprise a cache (e.g., L2CACHE), a direct memory access (DMA) engine, graphic direct memory access (GDMA) engine, fast random access memory, etcetera. The circuit 430 may implement a sensor input (or interface). The circuit 432 may implement one or more control interfaces including but not limited to an inter device communication (IDC) interface, an inter integrated circuit ($I^2C$) interface, a serial peripheral interface (SPI), and a pulse width modulation (PWM) interface. The circuit 434 may implement an audio interface (e.g., an $I^2S$ interface, etc.). The circuit 436 may implement a clock circuit including but not limited to a real time clock (RTC), a watchdog timer (WDT), and/or one or more programmable timers. The circuit 438 may implement an input/output (I/O) interface. The circuit 440 may be a video output module. The circuit 442 may be a communication module. The circuits 420 through 442 may be connected to each other using one or more buses, interfaces, traces, protocols, etc.

The circuit 410 may be implemented as a nonvolatile memory (e.g., NAND flash memory, NOR flash memory, etc.). The circuit 412 may comprise one or more removable media cards (e.g., secure digital media (SD), secure digital extended capacity media (SDXC), etc.). The circuit 414 may comprise one or more serial interfaces (e.g., RS-485, RS-232, etc.). The circuit 416 may be an interface for connecting to or acting as a universal serial bus (USB) host. The circuit 58 may be a wireless interface for communicating with a user device (e.g., a smart phone, a computer, a tablet computing device, cloud resources, etc.). In various embodiments, the circuits 404-416 may be implemented as components external to the processor/camera circuit 402. In some embodiments, the circuits 404-416 may be components on-board the processor/camera circuit 402.

The control interface 432 may be configured to generate signals (e.g., IDC/I2C, STEPPER, IRIS, AF/ZOOM/TILT/PAN, etc.) for controlling the lens and sensor assembly 90. The signal IRIS may be configured to adjust an iris for the lens assembly 920. The interface 430 may enable the processor/camera circuit 402 to control the lens and sensor assembly 90.

The storage interface 426 may be configured to manage one or more types of storage and/or data access. In one example, the storage interface 426 may implement a direct memory access (DMA) engine and/or a graphics direct memory access (CDMA). In another example, the storage interface 426 may implement a secure digital (SD) card interface (e.g., to connect to the removable media 412). In various embodiments, programming code (e.g., executable instructions for controlling various processors and encoders of the processor/camera circuit 402) may be stored in one or more of the memories (e.g., the DRAM 114, the NAND 410, etc.). When executed by the processor 420, the programming code generally causes one or more components in the processor/camera circuit 402 to configure video synchronization operations and start video frame processing operations. The resulting compressed video signal may be presented to the storage interface 426, the video output 440 and/or communication interface 442. The storage interface 426 may transfer program code and/or data between external media (e.g., the DRAM 114, the NAND 410, the removable media 412, etc.) and the local (internal) memory system 428.

The sensor input 430 may be configured to send/receive data to/from the image sensor 94. In one example, the sensor input 430 may comprise an image sensor input interface. The sensor input 430 may be configured to transmit captured images (e.g., picture element, pixel, data) from the image sensor 94 to the DSP module 424, the processor 420 and/or the coprocessor 422. The data received by the sensor input 430 may be used by the DSP 424 to determine a luminance (Y) and chrominance (U and V) values from the image sensor 94. The sensor input 430 may provide an interface to the lens and sensor assembly 90. The sensor input interface 430 may enable the processor/camera circuit 402 to capture image data from the lens and sensor assembly 90.

The audio interface 434 may be configured to send/receive audio data. In one example, the audio interface 434 may implement an audio inter-IC sound ($I^2S$) interface. The audio interface 434 may be configured to send/receive data in a format implemented by the audio codec 404.

The DSP module 424 may be configured to process digital signals. The DSP module 424 may comprise an image digital signal processor (IDSP), a video digital signal processor DSP (VDSP) and/or an audio digital signal processor (ADSP). The DSP module 424 may be configured to receive information (e.g., pixel data values captured by the image sensor 94) from the sensor input 430. The DSP module 424 may be configured to determine the pixel values (e.g., RGB, YUV, luminance, chrominance, etc.) from the information received from the sensor input 430. The DSP module 424 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 438 may be configured to send/receive data. The data sent/received by the I/O interface 438 may be miscellaneous information and/or control data. In one example, the I/O interface 438 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 440 may be configured to send video data. For example, the processor/camera circuit 402 may be connected to an external device (e.g., a TV, a monitor, a laptop computer, a tablet computing device, etc.). The video output module 440 may implement a high-definition multimedia interface (HDMI), a PAL/NTSC interface, an LCD/TV/Parallel interface and/or a DisplayPort interface.

The communication module 442 may be configured to send/receive data. The data sent/received by the communication module 442 may be formatted according to a particular protocol (e.g., BLUETOOTH, USB, Wi-Fi, UART, etc.). In one example, the communication module 442 may implement a secure digital input output (SDIO) interface. The communication module 442 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 442 may also include support for communicating using one or more of the universal serial bus protocols (e.g., USB 1.0, 2.0, 3.0, etc.). The processor/camera circuit 402 may also be configured to be powered via a USB connection. However, other communication and/or power interfaces may be implemented accordingly to meet the design criteria of a particular application.

The processor/camera circuit 402 may be configured (e.g., programmed) to control the one or lens assemblies 92 and the one or more image sensors 94. The processor/camera circuit 402 may receive raw image data from the sensor(s) 94. The processor/camera circuit 402 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 402 may receive encoded and/or uncoded (e.g., raw) audio data at the audio interface 434. The processor/camera circuit 402 may also receive encoded audio data from the communication interface 442 (e.g., USB and/or SDIO). The processor/camera circuit 402 may provide encoded video data to the wireless interface 442 (e.g., using a USB host interface). The wireless interface 442 may include support for wireless communication by one or more wireless and/or cellular protocols such as BLUETOOTH, ZIGBEE, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 402 may also include support for communication using one or more of the universal serial bus protocols (e.g., USB 1.0, 2.0, 3.0, etc.).

The functions and structures illustrated in the diagrams of FIGS. 1 to 10 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an image sensor configured to generate a sequence of video frames based on a targeted view of an environment; and
a processor configured to (i) collect data samples from a gravity sensor (G-sensor) and a gyroscopic sensor, (ii) detect X/Y/Z axes transitions using the data samples from said gyroscopic sensor, (iii) perform, in real-time, electronic image stabilization comprising (a) matching axes transition samples with captured image data of the sequence of video frames and (b) generating stabilized captured image data by compensating the captured image data for X/Y axes transitions using an X/Y offset and compensating the captured image data for Z axis transitions using a Z offset, (iv) compute a horizon level based on the data samples from said G-sensor and the data samples from said gyroscopic sensor, (v) perform, in real-time, a rotational offset compensation on the stabilized captured image data of the sequence of video frames to maintain alignment of a respective horizon in each frame of the sequence of video frames with the computed horizon level, and (vi) generate video analytics for the sequence of video frames using the compensated and stabilized captured image data, wherein the electronic image stabilization and rotational offset compensation provides improved accuracy of the video analytics generated for the sequence of video frames.

2. The apparatus according to claim 1, further comprising one or more sensors configured to capture movement information used to determine the electronic image stabilization applied to the captured image data prior to the rotational offset compensation.

3. The apparatus according to claim 2, wherein said one or more sensors comprise at least one of an inertial measurement unit and an accelerometer.

4. The apparatus according to claim 1, wherein said video analytics comprise face detection.

5. The apparatus according to claim 1, wherein said video analytics comprise face tracking.

6. The apparatus according to claim 1, wherein said apparatus is part of an unmanned aerial vehicle.

7. The apparatus according to claim 1, wherein (i) said processor comprises a digital signal processing hardware module and (ii) said electronic image stabilization is performed on said captured image data by said digital signal processing hardware module prior to the rotational offset compensation.

8. The apparatus according to claim 7, wherein said digital signal processing hardware module is further configured to perform said rotational offset compensation on said stabilized captured image data to maintain said horizon level of said targeted view.

9. The apparatus according to claim 1, wherein said apparatus is implemented as a system on chip (SoC).

10. A method of performing video analytics comprising:
generating a sequence of video frames based on a targeted view of an environment using a video camera;
collecting, using a processor, data samples from a gravity sensor (G-sensor) and a gyroscopic sensor;
detecting X/Y/Z axes transitions, using said processor, based on the data samples from said gyroscopic sensor;
performing, in real-time using said processor, electronic image stabilization comprising (i) matching axes transition samples with captured image data of the sequence of video frames and (ii) generating stabilized captured image data by compensating the captured image data for X/Y axes transitions using an X/Y offset and compensating the captured image data for Z axis transitions using a Z offset;
computing, using said processor, a horizon level based on the data samples collected from said G-sensor and the data samples collected from said gyroscopic sensor;
performing, in real-time using said processor, a rotational offset compensation on the stabilized captured image data of the sequence of video frames to maintain alignment of a respective horizon in each frame of the sequence of video frames with the computed horizon level; and
generating video analytics for the sequence of video frames using the compensated and stabilized captured image data, wherein the electronic image stabilization and rotational offset compensation provides improved accuracy of the video analytics generated for the sequence of video frames.

11. The method according to claim 10, wherein said video analytics comprise face detection.

12. The method according to claim 10, wherein said video analytics comprise face tracking.

13. The method according to claim 10, wherein said video camera is part of an unmanned aerial vehicle.

14. The method according to claim 10, further comprising performing vibration correction on the sequence of video frames.

15. The method according to claim 10, further comprising using one or more sensors to capture movement information used to determine the electronic image stabilization applied to the captured image data prior to the rotational offset compensation.

16. The method according to claim 15, wherein said one or more sensors comprise at least one of an inertial measurement unit and an accelerometer.

* * * * *